US007807926B2

(12) United States Patent
Samoto

(10) Patent No.: US 7,807,926 B2
(45) Date of Patent: Oct. 5, 2010

(54) FLEXIBLE CABLE HARNESS AND IMAGE FORMING APPARATUS

(75) Inventor: Kenji Samoto, Inuyama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1573 days.

(21) Appl. No.: 10/669,687

(22) Filed: Sep. 25, 2003

(65) Prior Publication Data

US 2004/0056926 A1 Mar. 25, 2004

(30) Foreign Application Priority Data

Sep. 25, 2002 (JP) ............................ 2002-278691

(51) Int. Cl.
*H02G 3/04* (2006.01)

(52) U.S. Cl. ......................... 174/72 A; 174/79; 174/81; 174/254; 361/826; 361/827

(58) Field of Classification Search .......... 361/826–827
See application file for complete search history.

(56) References Cited

U.S. PATENT DOCUMENTS 6,257,898 B1 * 7/2001 Serizawa et al. .............. 439/34

FOREIGN PATENT DOCUMENTS

| | | |
|---|---|---|
| JP | U-63-187368 | 11/1988 |
| JP | A 3-35565 | 7/1991 |
| JP | A-4-133780 | 5/1992 |
| JP | A 4-133780 | 5/1992 |
| JP | U-6-21949 | 3/1994 |

* cited by examiner

*Primary Examiner*—Tuan T Dinh
(74) *Attorney, Agent, or Firm*—Oliff & Berridge, PLC

(57) ABSTRACT

Flexible cables are connected to a movable member at a first end and a fixed member at a second end, each having a curve in between the first end and the second end. The flexible cables each include a first positioning system near the first end in the curve and a second positioning system near the second end in the curve, and they have different distances between the first positioning system and the second positioning system. The first positioning system and the second positioning system are fixed to a first positioning portion and a second positioning portion respectively. The flexible cables are spaced from each other to define clearances thereamong at the curve.

17 Claims, 6 Drawing Sheets

FLEXIBLE CABLE HARNESS AND IMAGE FORMING APPARATUS

BACKGROUND OF THE INVENTION

1. Field of Invention

The invention relates to a flexible cable harness for use in an image forming apparatus. In particular, the invention relates to a flexible cable harness with a plurality of flexible cables that transmit electrical signals from a main body to a carriage in an image forming apparatus, such as a printer, a facsimile machine, and a copier.

2. Description of Related Art

Conventionally, there exists ink jet image forming apparatuses, such as a printer, a facsimile machine, and a copier, in which a carriage mounted in an ink cartridge thereon reciprocates in a main scanning direction to perform printing on a recording medium. In such an apparatus as shown in FIG. 6, a round guide shaft 211 is disposed between a left side plate 212*e* and a right side plate 212*f*, and a carriage 210 is slidingly guided onto the guide shaft 211 to reciprocate in an X direction. The carriage 210 includes a recording head 215 that ejects ink. When the recording head 215 is designed for color printing, it communicates with a control part 200 fixed to a main body of the image forming apparatus to transmit drive signals via four flexible flat cables (hereinafter referred to as flexible cables) FFC1-FFC4.

The flexible cables FFC1-FFC4 are connected to corresponding connectors 201 of the control part 200 at one end and corresponding connectors 203 of the recording head 215 at the other end. The flexible cables FFC1-FFC4 drawn from the connectors 201 are tied in a bundle to a rear frame 212 near the connectors 201 by a binding plate 202 so as to prevent entanglement. The flexible cables FFC1-FFC4 are bent at a curve A and tied in a bundle near the connectors 203 by a binding plate 204.

When the carriage 210 reciprocates in the X direction, the flexible cables FFC1-FFC4 also move while bending more at the curve A. Especially, the flexible cables located more inward at the curve A may suffer more stress. Further, while the adjacent cables rub against each other, they are also subjected to stress. For these reasons, the flexible cables may be prone to damage or breakage at an early stage.

Japanese Laid-Open Patent Publication No. 4-133780 proposes that, as a method for fixing a plurality of flexible cables in a bundle, each flexible cable has the same length between two connectors. Each cable is also provided with its own positioning hole thereon, so as to fit around a protrusion provided on the carriage.

However, as the length between the connectors is the same on each cable, arranging the connectors separately restricts the connector positions, greatly affects the arrangement of other element parts, and affects the size of the apparatus. Further, as the positioning hole is disposed at one place in the direction of the length of each cable, the conventional problem in that the length between two points to fix each flexible cable by adjusting the position of each cable is not solved.

SUMMARY OF THE INVENTION

The invention thus provides a flexible cable harness whose cables, which have different lengths, are set in place easily and free from undue stress at a curve without having to place a restriction on connector positions, and an image forming apparatus using such a flexible cable harness.

According to one exemplary aspect of the invention, a flexible cable harness may include a plurality of flexible cables. Each of the cables has a first end connected to a first object and a second end connected to a second object, and at least one of the cables contributes to an electrical connection between the first object and the second object. Each cable includes a curved portion that curves between the first end and the second end, a first positioning system provided near the first end in the curved portion, and a second positioning system provided near the second end in the curved portion. A distance from the first positioning system to the second positioning system is different in each of the plurality of flexible cables such that the more inward the flexible cables are located at the curved portion, the shorter the distance is between the first positioning system and the second positioning system. The first positioning system of each of the plurality of flexible cables is fixed to a first positioning part provided on or near the first object. The second positioning system of each of the plurality of flexible cables is fixed to a second positioning part provided on or near the second object. Each cable is spaced in the curved portion.

Thus, the flexible cable harness is structured wherein the flexible cables located more inward at the curve have a shorter distance from the first positioning system to the second positioning system. This structure can prevent breakage or damage to the cables caused by deflection at the curve area and sets the cables in place without the need for measuring the distance between the first positioning system and the second positioning system that varies according to each cable.

Specifically, the first object is a fixed member such as a frame, and the second object is a movable member such as a carriage. The flexible cable harness may be structured where the first positioning system of each flexible cable may be fixed to a first positioning part provided fixedly with the fixed member, and the second positioning system of each flexible cable may be provided on or near the movable member and fixed to a second positioning part, which is movable with the movable member.

In an image forming apparatus including the flexible cable harness structured as above, a frame may include left and right side plates supporting a guide shaft that guides the carriage in a movable direction and a rear frame provided between the left and right side plates. The carriage may have a substantially box shape and two sides for positioning the recording head. The first positioning part is disposed at a substantially central portion of the rear frame with respect to a left to right direction thereof, and the second positioning part is disposed on one of the two sides of the carriage. The flexible cable harness is kept curved when the carriage reciprocates sideways in the frame, however, the flexible cables are spaced from each other to define a clearance thereamong and free from stress caused by collision against each other. Thus, with this structure of the harness, its durability increases and a burden on maintenance of the image forming apparatus is reduced, thereby increasing the useful life of the image forming apparatus.

BRIEF DESCRIPTION OF THE DRAWINGS

An embodiment of the invention will be described in detail with reference to the following figures wherein.

DETAILED DESCRIPTION OF PREFERRED EMBODIMENTS

Figure 1:
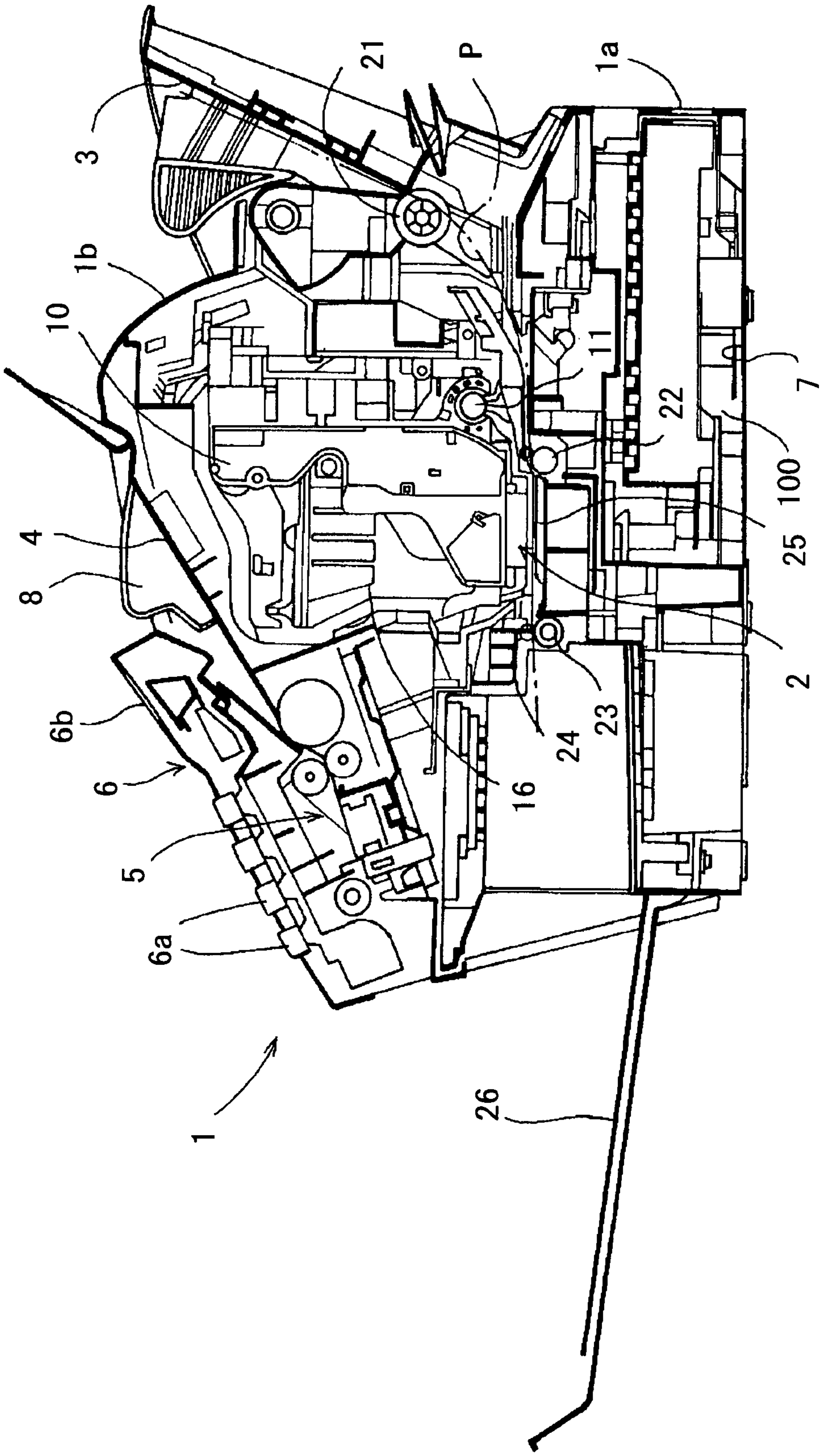
FIG. 1 is a right side view of a printer also serving as a facsimile machine as an example of an image forming apparatus applied to an embodiment of the invention.

An embodiment of the invention will be described in detail with reference to the accompanying drawings. As shown in FIG. 1, a printer 1 includes a normal facsimile machine function that does the following according to a key input through an operation panel 6: sets various operations; reads a document image(s) by a document reading unit 5; converts document images into transmission data; encodes the transmission data; transmits or receives facsimile data to or from other facsimile machines via a communications line; decodes the received data; and performes recording of the decoded facsimile data to a sheet of paper P in the recording unit. The printer 1 further includes a copier function that scans in a document by a contact image sensor (CIS) of the document reading unit 5 to form a color image on a sheet P by each unit of a recording part, a printer function that receives print data transmitted from an external device such as a personal computer via a printer cable or by wireless such as infrared radiation to form a color image onto a recording sheet P according to the received data, and a scanner function that uses the document reading unit 5 to send the read image to the external device.

A main case of the printer 1 is made up of a main lower case 1*a* and a main upper case 1*b*, which are both made from synthetic resin. The lower case 1*b* accommodates an ink jet recording part 2 and includes a backward-leaning paper feed tray 3 disposed at an upper rear part. Recording sheets P for image formation are supplied from the paper feed tray 3 into the printer 1. The lower case 1*a* is covered with the upper case 1*b*. On an upper surface of the main upper case 1*b*, a document loading part 4 is disposed toward the rear and the document reading unit 5 is disposed toward the front. The document reading unit 5 is covered with an operation panel 6 having an operation key part 6*a* and a display 6*b*. The operation key part 6*a* includes function keys and a ten-key numeric pad. The document loading part 4 is provided, on both sides, with a pair of document guide members 8 that guide both side edges of a document to be conveyed into the document reading unit 5.

An under surface of the main lower case 1*a* is covered with a metal bottom cover plate 7, and a control part 100 is disposed in an internal space of the main lower case 1*a*. The control part 100 includes a control circuit board, a power supply circuit board, and a network control unit (NCU) circuit board that allows transmission and reception of conversation or facsimile data with the party on the end of the telephone or facsimile machine by telephone lines (which are not shown). A handset (not shown) for two-way conversation with another telephone is placed on a cradle outwardly projecting from a side of the main lower case 1*a*. A speaker for issuing alarms and monitoring calls is secured to the right rear side of the main lower case 1*a*.

The sheets P stacked on the paper feed tray 3 are separated from the top of the stack one by one by a sheet feed roller 21 and a separator disposed at a rear portion of the main lower case 1*a*. The sheet feed roller 21 and the separator are structured as a known paper feed mechanism. The separated sheet P is fed to a conveying roller 22 such that the position of the leading edge of the sheet P is adjusted. The sheet P is then fed between a recording head 15 (FIG. 2) and a platen 25, and pinched between a pair of ejecting rollers 23 and 24 disposed vertically on a downstream side of a sheet conveying direction. While the sheet P is pinched and conveyed between the ejecting rollers 23 and 24, ink drops are ejected onto the sheet P in accordance with printing commands to form an image, and the sheet P where the image is formed is ejected to a discharged tray 26.

Figure 2A:
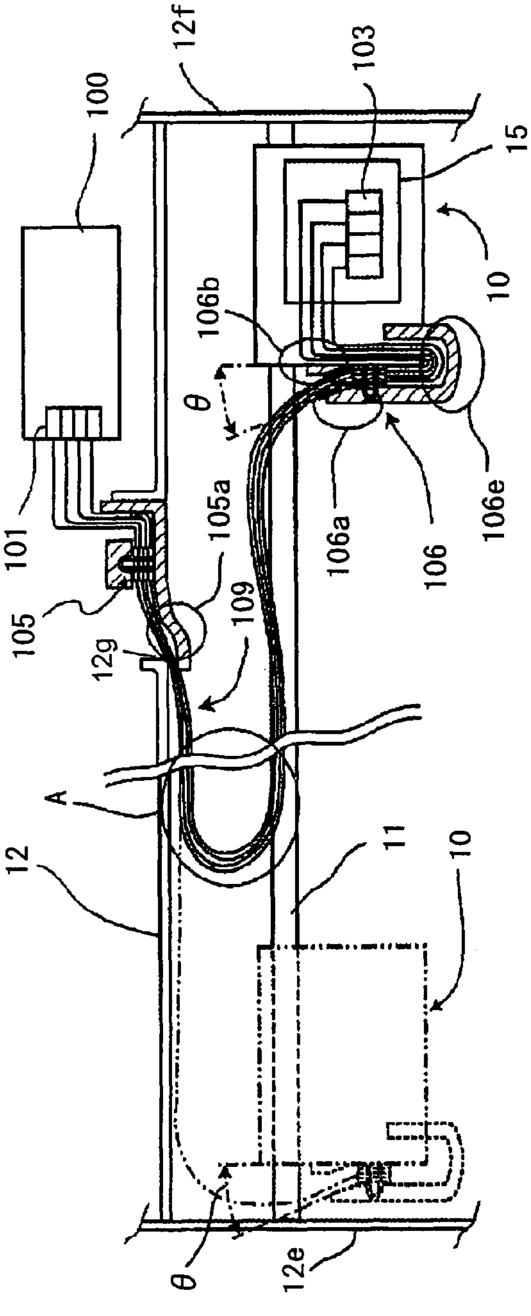
FIG. 2A is a top view of a recording part in which flexible cables are arranged.
Figure 2B:
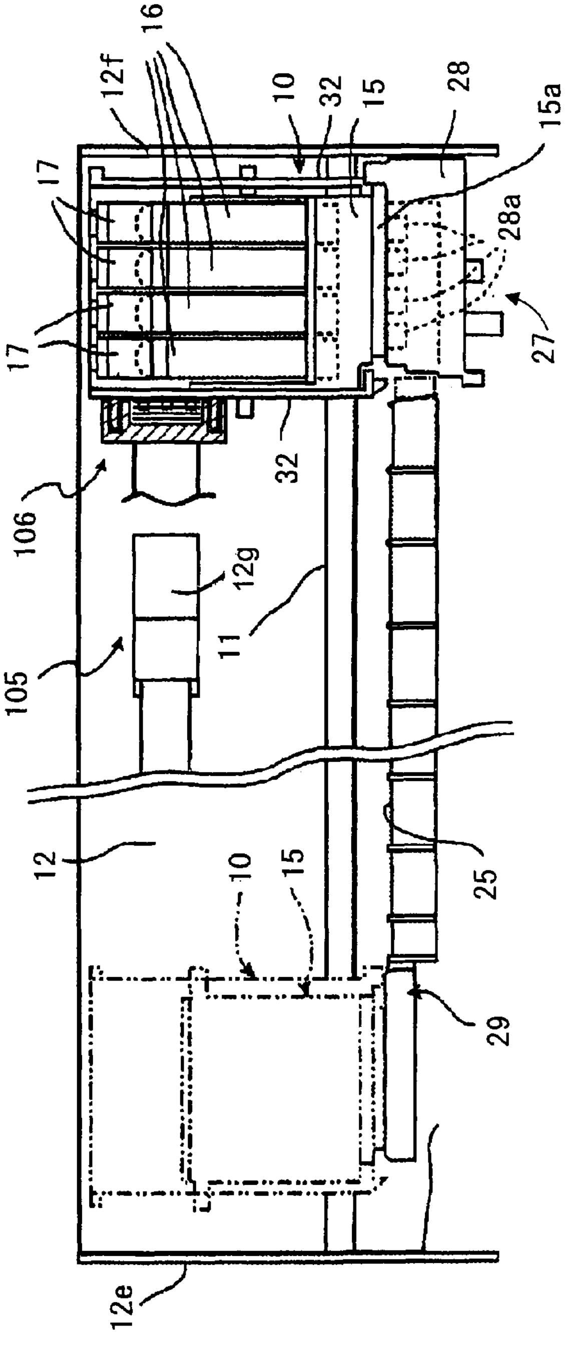
FIG. 2B is a front view of the FIG. 2B.

As shown in FIGS. 1 and 2, a round guide shaft 11 is disposed between a left side plate 12*e* and a right side plate 12*f*, and a carriage 10 in a recording part 2 is slidably mounted to the guide shaft 11 at its lower rear end. The recording head 15 of a cartridge type is detachably mounted in the carriage 10 such that the recording head 15 faces downward and is pinched between left and right side plates 32 of the carriage 10. To perform color printing, the recording head 15 has four nozzle portions 15*a* for ejecting four ink colors of cyan, yellow, magenta, and black respectively, on its lower surface. Ink cartridges 16, each containing a corresponding ink which is to be supplied to the recording head 15, are attached to the recording head 15 so as to be detachable from the top of the recording head 15. The ink cartridges 16 are held downward by presser levers 17, which are rotatable frontward and disposed on the top end of the carriage 10.

A timing belt (not shown) extending parallel with the guide shaft 11 is looped around a driven pulley (not shown), which is disposed to one side of the rear frame 12, and a driving pulley (not shown), which is fixed to an output shaft of a driving motor, such as a stepping motor, that can rotate both clockwise and counterclockwise. The timing belt placed on the pulleys is connected to the carriage 10, thereby enabling the carriage 10 to reciprocate parallel with the guide shaft 11.

Printing operations by the carriage 10 will be described with reference to FIG. 2. A maintenance portion 27 is provided on the right side of the platen 25 outside the recording area. A nozzle wiping device that wipes ink drops adhered to the surface of the nozzle portions 15*a* of the recording head 15 and a purge device 28 that recovers the state of the ink to be ejected from the recording head 15 are disposed in the maintenance portion 27. The purge device 28 is provided with suction caps 28*a*. The purge device 28 is constructed such that the nozzle portions 15*a* of the recording head 15 are covered with the corresponding suction caps 28*a*, a negative pressure generated by a pump is applied to the nozzle portions 15*a*, poor quality ink remaining in the recording head 15 is removed by suction, and the state of ink ejection is recovered. The purge device 28 in the maintenance portion 27 is positioned at the home position (at the right end in FIG. 2), and the purge device 28 also serves as a capping device that covers all the nozzle portions 15*a* of the recording head 15 of the carriage 10 to prevent drying of ink. The suction caps 28*a* also serve as protective caps. A flushing portion 29 that causes ink to be ejected tentatively from each nozzle portion 15*a* of the recording head 15 in order to prevent ink clogging is provided on the left end of the platen 25.

A flexible cable harness 109, which is made by tying flexible cables in a bundle and transmits electrical signals between the recording head 15 and a control part 100, will be described. The flexible cable harness 109 electrically connects the control part 100, that is usually fixed to a bottom plate or a frame of the printer 1 and sends image signals for recording and control signals, to the recording head 15 that reciprocates from side to side with respect to FIG. 2 and ejects ink from the nozzle portions 15*a* in accordance with the image signals and the control signals. One end of each of the flexible cables (FFC1 to FFCn in FIG. 3), that make up the flexible cable harness 109, is connected to a corresponding connector 101 provided in the control part 100, and the other end is connected to a corresponding connector 103 of the recording head 15.

As described above, the flexible cable harness 109 is connected to a fixed part at one end and a movable part at the other end. If the flexible cable harness 109 is not fixedly held at any place, it may unnecessarily contact or rub against other structural elements in the printer 1 with the movement of the flexible cable harness 109 attached to the movable part, and may resultantly become damaged. Therefore, the flexible cables coming from the connectors 101 are fixed to the rear frame 12 via a first positioning part 105. The flexible cables are sent from the rear of the rear frame 12 (where the control part 100 is placed) to the front along a first guide part 105*a* of the first positioning part 105, bent at the front to form a curve A, inserted into a second positioning part 106 and fixedly held therein.

In detail, the flexible cables are inserted and guided between a second guide part 106*a* and a third guide part 106*b* of the second positioning part 106, and are held in the second positioning part 106. The flexible cables are further guided inside the carriage 10 along an internal surface of a fourth guide part 106*e*, and connected to the connectors 103 of the recording head 15. Thus, the flexible cable 109 is fixed not only to the connectors 101 and 103 but also at the first and second positioning parts 105 and 106. Accordingly, the flexible cable harness 109 is fixed at the first positioning part 105, which is the fixed part, and moved by the second positioning part 106 that is moved with the travel of the carriage 10. Even when the position and the state of the curve A are changed, the flexible cable harness 109 can communicate electrical signals without unnecessarily rubbing against the other structural elements.

The more internally placed the flexible cables are relative to the curve A, the length of a cable from the first positioning part 105 to the second positioning part 106 should be set shorter. However, to fix the flexible cables, measuring the length from the first positioning part 105 to the second positioning part 106 every time each one of the flexible cables is arranged is inefficient and may cause an error. Therefore, in the embodiment, a mechanism that can fix and hold the flexible cables with a single motion without the necessity of measuring the length for each cable is adopted. The details of the mechanism will be described as follows.

Appropriate spacing among the adjacent flexible cables at the curve A is determined by various factors such as the cable elasticity, the number of cables, the cable thickness, width, length, the size of the curve, and the shape of the curve. When the flexible cable harness 109 is given an appropriate elasticity to form an optimum curve or the cables are likely to rub against the other structural elements of the printer 1, a film cable FC1 (FIG. 3, described later in detail) that does not contribute to the electrical connection may be used as an interference or protective cable and is arranged along other cables so as to be placed at the outside, inside, or each side of the curve A. Based on the spacing among the adjacent flexible cables determined by the above factors, the distance from the first positioning part 105 to the second positioning part 106 required for each cable is calculated in such a manner that the more outward at the curve A the flexible cables are located, the distance becomes correspondingly longer. The calculated length is assigned to each one of the flexible cables.

Figure 3:
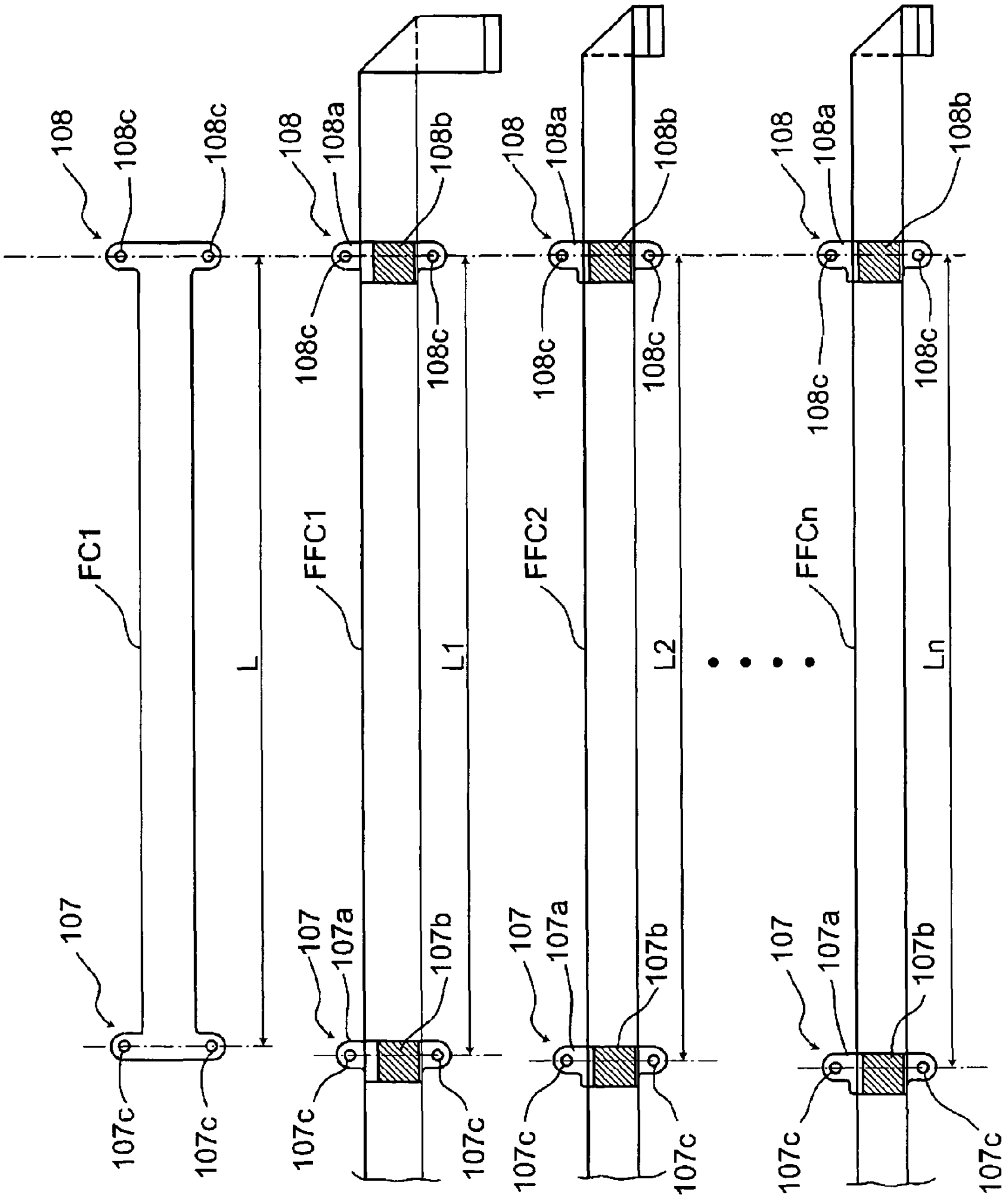
FIG. 3 shows a film cable and flexible cables which are provided with positioning systems.

The distance between the two positioning places, which varies according to each cable, will be described in detail with reference to FIG. 3. In FIG. 3, the film cable FC1 is made of a film that does not contribute to an electrical connection and has a length L between the two positioning places. A flexible cable FFC1 is located outside the flexible cable FC1 at the curve A and has a length L1 between the two positioning places. A flexible cable FFC2 is located outside the cable FFC1 at the curve A and has a length L2 between the two positioning places. A flexible cable FFCn is placed outermost at the curve A and has a length Ln between the two positioning places. Flexible cables FFC3 to FFCn-1 are not shown in FIG. 3. As shown in FIG. 2, the flexible cables FFC1 to FFCn are connected to the control part 100 at their left ends and to the recording head 15 at their right ends, thereby contributing to an electrical connection between the control part 100 and the recording head 15. A beginning of the film cable FC1 is at the first positioning part 105 and an end of the film cable FC1 is at the second positioning part 106.

The film cable FC1 is provided with a first positioning system 107 at the left end (shown in FIG. 3). The first positioning system 107 includes a pair of positioning holes 107*c* aligned vertically across the width of the film cable FC1. Projections 105*c* (FIG. 4) of the first positioning part 105 are to be inserted into the positioning holes 107*c*. The film cable FC1 is provided with a second positioning system 108 at the right side (shown in FIG. 3) thereof. The second positioning system 108 includes a pair of positioning holes 108*c* aligned vertically across the width of the film cable FC1. Projections 106*c* (FIG. 5) of the second positioning part 106 are to be inserted into the positioning holes 108*c*. The first positioning system 107 and the second positioning system 108 are integrally formed with the film cable FC1. In this case, a length between the first positioning system 107 and the second positioning system 108, in other words, a length between a center line of the positioning holes 107*c* and a center line of the positioning holes 108*c*, is set to the length L.

Similarly, the flexible cables FFC1 to FFCn each have a first positioning system 107 with a pair of positioning holes 107*c* aligned vertically across their width near their left ends. The projections 105*c* of the first positioning part 105 are to be inserted into the positioning holes 107*c*. Further, the flexible cables FFC1 to FFCn each have a second positioning system 108 with a pair of positioning holes 108*c* aligned vertically across their width near their right ends. The projections 106*c* of the second positioning part 106 are to be inserted into the positioning holes 108*c*.

In the embodiment, the first positioning system 107 and the second positioning system 108 provided on each of the flexible cables FFC1 to FFC are formed by bonding tab-shaped sheets 107*a* and 108*a*, which have been punched separately, to bonded surfaces 107*b* and 108*b* at both ends of the cable using adhesive or double-faced tape. Not being limited to this, however, the first positioning system 107 and the second positioning system 108 may be integrally formed with the flexible cable FFC1 to FFCn during manufacturing, as is the case with the film cable FC1.

When the first and second positioning systems 107 and 108 are attached to each cable FFC1 to FFCn, the manufacturing of various flexible cables is simplified. When the first and second positioning systems 107 and 108 are integrally formed with each cable, it is necessary to provide production facilities with a plurality of presses in order to make the first and second positioning systems 107 and 108 at different positions. On the other hand, when the first and second positioning systems 107 and 108 are attached, new facilities that do not include the machine that make the tab-shaped sheets 107*a* and 108*a* are not necessary.

When the first and second positioning systems 107 and 108 are integrally formed with each cable FFC1 to FFCn, manufacturing processes can be reduced, production costs can be reduced, and positioning fluctuations can be minimized.

When the tab-shaped sheets 107a and 108a are bonded to a specific place on each of the flexible cables FFC1 to FFCn, the use of a jig, where the lengths of the flexible cables for bonding are indicated beforehand, may facilitate bonding precisely and smoothly without the need to measure such lengths as occasion demands.

In any of these instances, the length between the first positioning system 107 and the second positioning system 108 (the length between the center line of the positioning holes 107c and the center line of the positioning holes 108c) is set to any of the lengths L1 to Ln which are allocated to the cables. In the example shown in FIG. 3, the length L is the shortest, and the length Ln is the longest. In other words, the following equation holds: L<L1<L2< . . . <Ln-1<Ln. A difference of each length between L and L1, between L1 and L2, . . . between Ln-1 and Ln is set such that a curvature radius at the curve A is reduced by a specified amount as the flexible cables FFC1 to FFCn are located more inward at the curve A. However, it can be changed according to the shape of the curve A and the material used for the cable.

Specifically, in the embodiment, each of the cables FC1, FFC1 to FFCn is made of a 0.15 mm-thick and nearly 20 mm-wide flame-retardant polyester film sheet (for cables FFC1 to FFCn, further done with conductor wiring). The difference in length between the adjacent cables, that is, between L and L1, between L1 and L2, . . . between Ln-1 and Ln is set to 1.5 mm. However, it is not limited to this value. It should be taken for granted that an optimum cable length difference may vary according to the cables thickness and materials to be used. In the case of flexible cables used in general printers, when the length difference is from 1 mm to 3 mm, problems caused by cable deflection, such as cable breakage or frequent contacts between the cables can be prevented, and damage or breakage at an early stage can be also prevented.

The first positioning part 105 where the first positioning system 107 for each of the flexible cables FC1 and FFC1 to FFCn is fixedly maintained will be described in detail with reference to FIG. 4. The first positioning part 105 is inserted into a substantially rectangular opening 12g provided in a specified position of the rear frame 12 from the rear of the rear frame 12 (the side where the control part 100 shown in FIG. 2 is located). The first positioning part 105 has the projections 105c, which are vertically aligned with respect to the cable width direction so as to be engaged in the positioning holes 107c formed in the first positioning system 107 provided on each of the flexible cables FC1 and FFC1 to FFCn. In the embodiment, the film cable FC1 to be positioned inner mostly at the curve A (FIG. 2) is first placed in the first positioning part 105, and the flexible cables FFC1 to FFCn are overlaid on the film cable FC1 in this order. Finally, a lid 105b is closed in a direction of arrow C, thereby the first positioning system 107 of each cable can be reliably fixed to the first positioning part 105. Ends extending leftward from the first positioning systems 107 of the flexible cables FFC1 to FFCn shown in FIG. 3, exclusive of the film cable FC1, are connected to the control part 100 (FIG. 2), and the right ends of the flexible cables FFC1 to FFCn inclusive of the film cable FC1 (shown in FIG. 3) are sent along the first guide part 105a from the opening 12g to the front of the printer 1, curved to form the curve A, and taken in the carriage 10 (FIG. 2).

Figure 5:
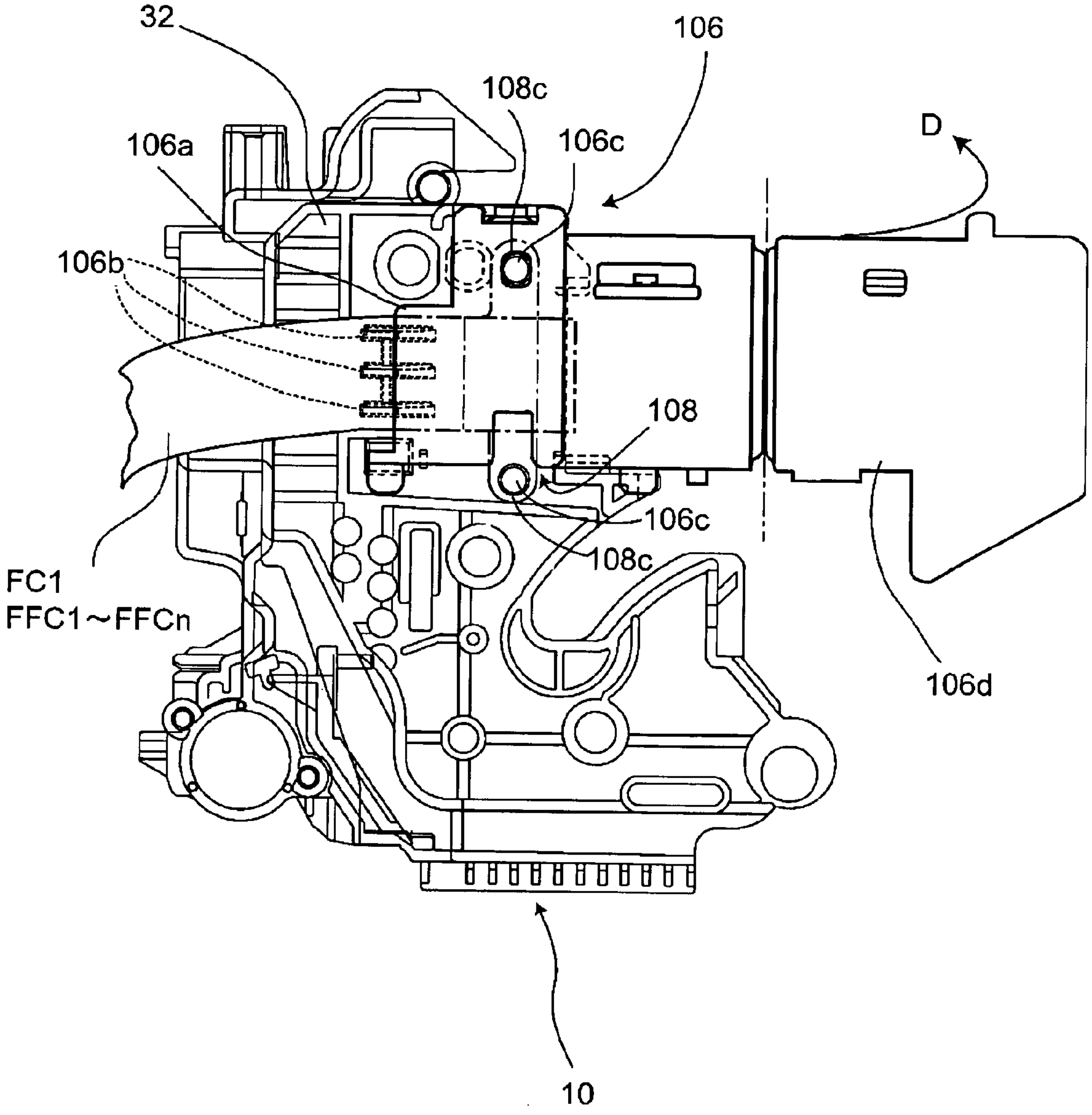
FIG. 5 is a left side view of a carriage showing a second positioning part disposed on the carriage.

In the carriage 10 as shown in FIG. 5, the film cable FC1 and the flexible cables FFC1 to FFCn are attached to the third guide part 106b of the second positioning part 106, which is formed in a ribbed shape on the left side plate 32 of the carriage 10. The two positioning holes 108c of the second positioning system 108 provided on each of the film cable FC1 and the flexible cables FFC1 to FFCn are fitted over the two projections 106c formed on the left side plate 32 of the carriage 10, so that the cables are positioned in place. The second positioning part 106 is mounted on the left side plate 32 so as to cover the second positioning system 108 of each cable. The flexible cables FFC1 to FFCn are inserted into the second positioning part 106 with a specified angle θ (FIG. 2) relative to a direction perpendicular to the travel direction of the carriage 10 by the guide of the second guide part 106a and the third guide part 106b. The flexible cables FFC1 to FFCn are brought inside the carriage 10 as shown in FIG. 2, a presser lid 106d is closed in such a manner as to fold into the direction of arrow D in FIG. 5, thereby the second positioning system 108 of each cable is reliably fixed on the carriage 10. Thereafter the flexible cables FFC1 to FFCn are connected to the connectors 103 of the recording head 15. Then, the recording head 15 is mounted on the carriage 10.

Figure 6:
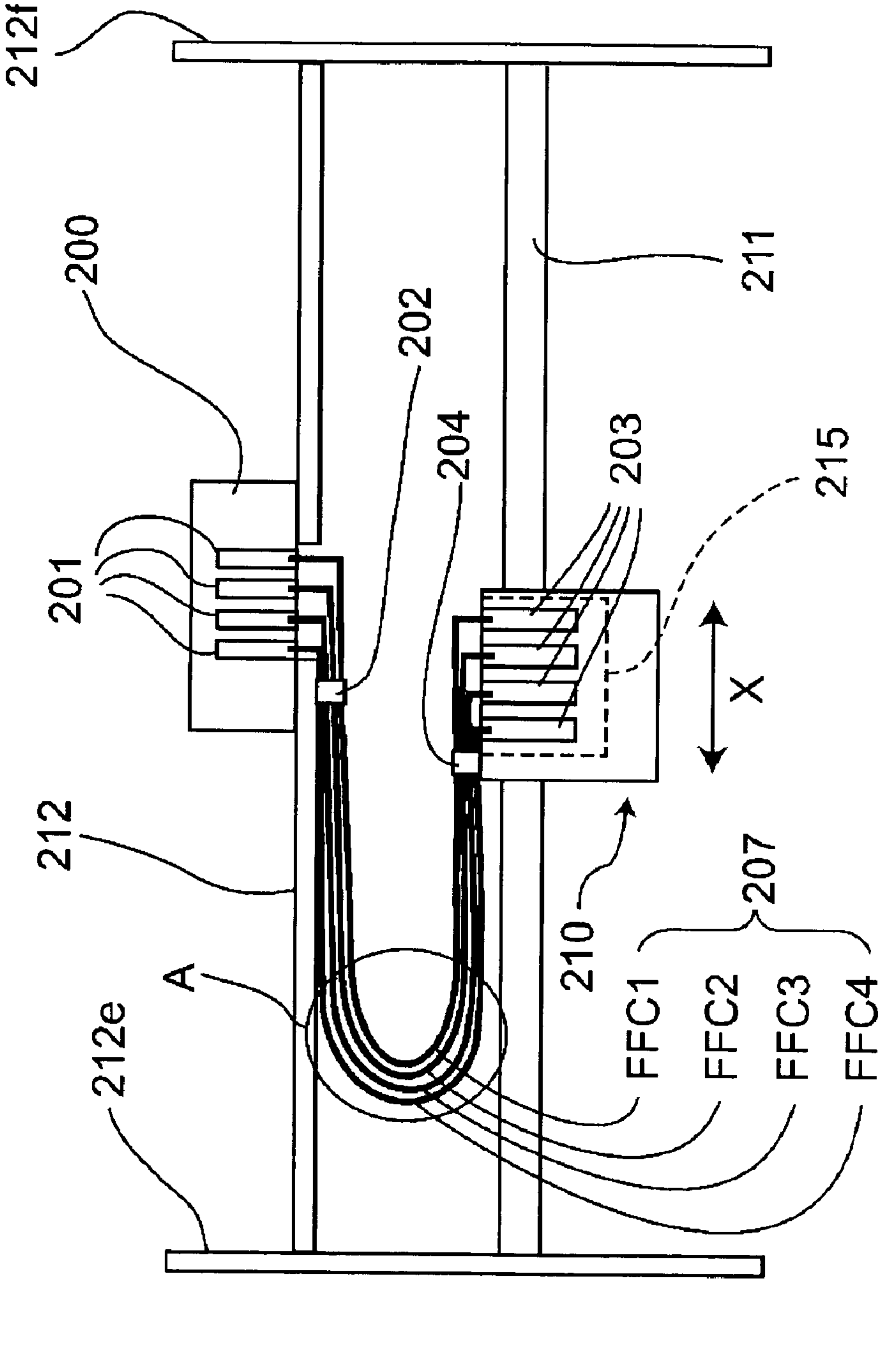
FIG. 6 is a schematic top view showing an image forming apparatus for use with a conventional flexible cable harness.

In the conventional structure shown in FIG. 6 where the binding plates 204 allow the flexible cable harness 207 to be sent in parallel with the direction X of which the carriage 210 moves, the flexible cable harness 207 may heavily collide against the left side plate 212e at the curve A and may swing from the binding plates 204 greatly and vertically, and reaction stress may focus on the curve A of the flexible cable harness 207 or around the binding plates 204, causing breakage of the cables at an early stage. Although it is not shown, for the sake of scattering the reaction stress applied to the curve A and the binding plates 204 around, it can be considered that the binding plates 204 may be modified to guide the harness in a lower-left direction in FIG. 6. However, when the carriage 210 moves toward the left end in FIG. 6, the arc of the curve A will expand and a great space to the left side plate 212e or to the lower-left part of the figure will be needed. If there is no space for it, the curve A may be pushed into or collide against the left side plate 212e, thereby increasing the stress applied to the curve A and the binding plates 204 around.

In the embodiment, as shown in FIG. 2, the second guide part 106a and the third guide part 106b of the second positioning part 106 pinch the flexible cable harness 109 from both sides thereof so as to guide it with a specified angle θ toward the first positioning part 105, relative to the direction perpendicular to the travel direction of the carriage 10. In this case, the angle θ for example is an angle with which each cable can be bent toward the first positioning part 105 without suffering undue stress even when the carriage 10 moves to the left end or the center in the figure. As the angle θ becomes a part of the curvature of the curve A, even when the carriage 10 moves to the left end (a position indicated by a double dashed chain line), each cable is set with such an angle so as to be free from undue stress capable of forming the curve A with the necessary curvature and eliminates the need for a great space in a main scanning direction. Thus, this prevents the cables from being broken by stress fatigue generated by colliding against the left side plate 12e at the curve A. To obtain the above effect, it is desirable that the angle θ is within the range of 35° to 60°. In the embodiment, the second guide part 106a and the third guide part 106b are formed such that the angle θ is 50°. However, the optimum value for the angle θ varies depending on the material used for the flexible cables FFC1 to FFCn, their thickness, a positional relationship between the control part 100 and the carriage 10, and the movable range of the carriage 10.

Figure 4:
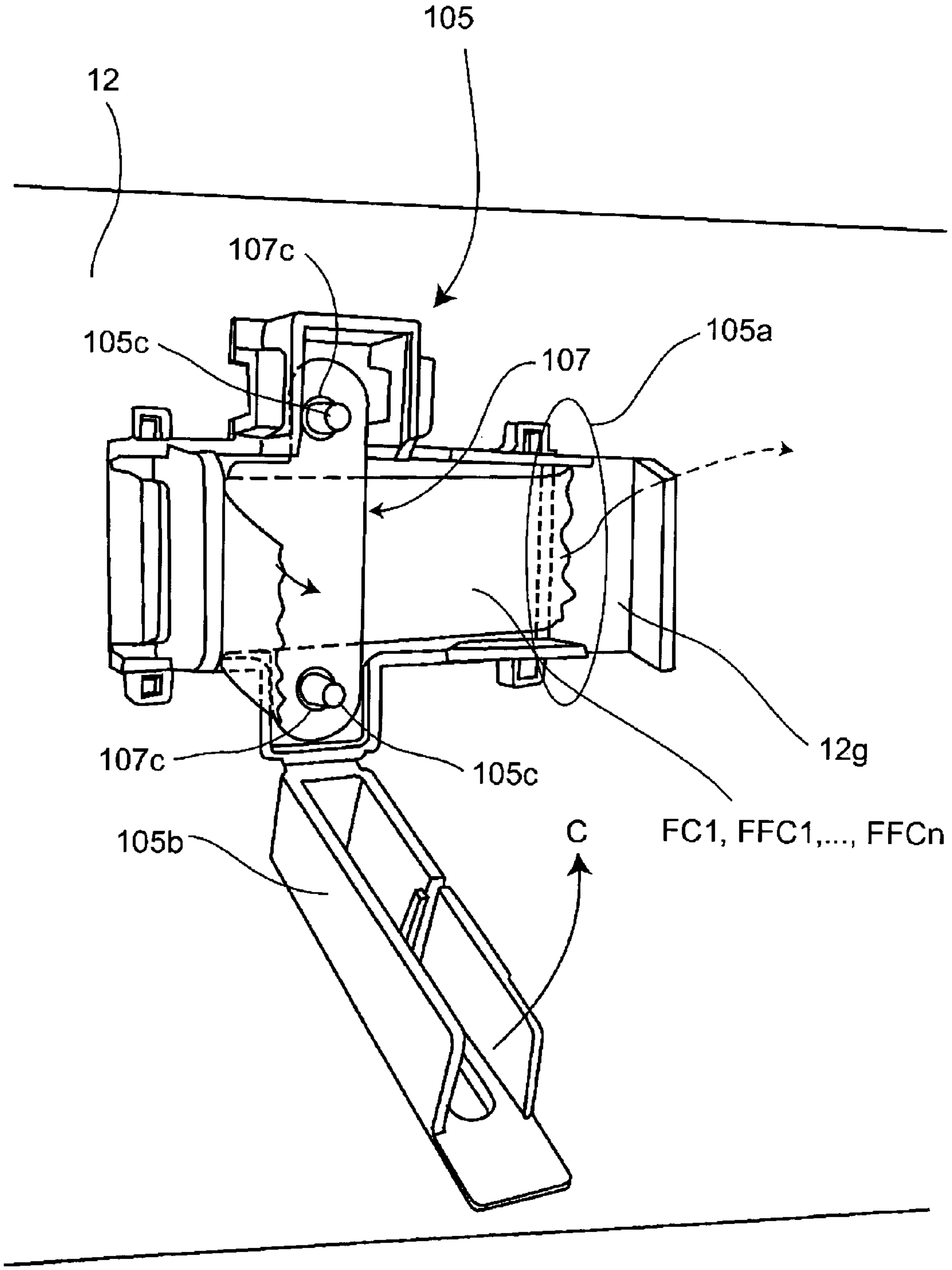
FIG. 4 is a perspective view seen from a rear of the printer showing a first positioning part disposed on a rear frame.

In FIGS. 4 and 5, the diameter of the positioning holes 107c and 108c provided on the first and second positioning systems

107 and 108 is shown larger than the diameter of the projections 105*c* and 106*c* provided on the first and second positioning parts 105 and 106, however it can be decreased. Especially when the positioning holes 107*c* and 108*c* are provided on the resilient tab-shaped sheets 107*a* and 108*a* or integrally provided with the film cable FC1 or the flexible cables FFC1 to FFCn, decreasing the diameter of the positioning holes 107*c* and 108*c* smaller than the diameter of the projections 105*c* and 106*c* makes the positioning holes 107*c* and 108*c* tightly fit around the projections 105*c* and 106*c*, thereby reliably engaging each other. This prevents the cables from loosening and coming apart when the cables are attached to the first and second positioning parts 105 and 106 or the structural elements of the first and second positioning parts 105 and 106 are mounted.

The flexible cables FFC1 to FFCn in the embodiment are set and kept in place with a two-point attachment, the two positioning holes 107*c* and 108*c* are each provided on both ends thereof. Compared with a single-point attachment, cables do not rotate around a positioning point as a pivot and are not inclined and displaced.

As described above, the tab-shaped positioning systems 107 and 108 are integrally formed with or separately attached to each cable at the two specified places with respect to its length. However, other shapes or mechanisms can be used without departing from the scope of the invention. The above embodiment has been described with a case where the cables are connected to the fixed part at one end and the movable part at the other end, however both ends of the cable harness can be connected to the fixed part or different movable parts as long as the harness is curvedly connected between two points. Further, the embodiment has been described with a flexible cable harness made of a plurality of flexible flat cables, however, it is not limited to this. The invention can be put into practice as long as a harness is made of similar flexible cables.

According to the embodiment, the flexible cable harness 109 is connected to the fixed part (the control part 100) at one end and the movable part (the carriage 10) at the other end and includes a plurality of flexible cables FFC1 to FFCn tied in a bundle, and at least one of the cables contributes to the electrical connection between the fixed part and the movable part. Each of the flexible cables FFC1 to FFCn is bent between one end and the other end thereof to form the curve A, and includes the first positioning system 107 near one end and the second positioning system 108 near the other end. The distance between the first positioning system 107 and the second positioning system 108 varies depending on the flexible cables FFC1 to FFCn. As the first and second positioning systems 107 and 108 are attached to the first and second positioning parts 105 and 106 respectively, the flexible cables FFC1 to FFCn are spaced from each other at the curve A. Thus, there is no need to set the flexible cables FFC1 to FFCn in place by measuring the length between the two positioning systems (L, L1, L2, . . . , Ln) that varies according to each cable. Upon manufacturing or maintenance of an apparatus using the flexible cable harness 109, the flexible cables FFC1 to FFCn can be set in place easily.

Further, the flexible cable harness 109 is structured wherein the flexible cables located more inward at the curve A have a shorter distance from the first positioning system 107 to the second positioning system 108. This structure can prevent breakage or damage to the cables FFC1 to FFCn caused by deflection at the curve A and sets the cables FFC1 to FFCn in place without the need for measuring the distance varying according to each cable.

The flexible cable harness 109 is structured wherein the distance between the first positioning system 107 and the second positioning system 108 is set in each cable such that a curvature radius at the curve A is reduced by a specified amount as the flexible cables FFC1 to FFCn are located more inward at the curve A. With this structure, as long as the distance from the first positioning system 107 to the second positioning system 108 is determined for the outermost and innermost cables, it is easy to determine the distance for other cables between the innermost and outermost cables.

In the flexible cable harness 109, the flexible cables FFC1 to FFCn are set in position by engagement with the first and second positioning systems 107 and 108 and the first and second positioning parts 105 and 106. This structure enables a snap attachment of the cables, and is extremely effective even when maintenance is performed where a number of adjustment tools can not be prepared. Further, the first and second positioning systems 107 and 108 are provided on the shorter side (i.e., inner side) of each of the flexible cables FFC1 to FFCn, and the positioning holes 107*c* and 108*c* thereof, which are provided outside across the width of each cable, are fitted around the corresponding projections 105*c* and 106*c* provided on the first and second positioning parts 105 and 106. Thereby the flexible cables FFC1 to FFCn are set in place. In other words, with a simple engagement of holes and projections, the first and second positioning systems 107 and 108 can be reasonably manufactured and the necessary positioning accuracy can be also ensured.

In the printer 1 using the flexible cable harness 109, the fixed part is the control part 100, the movable part is the carriage 10 mounting the recording head 15 thereon, the flexible cable harness 109 is connected between the control part 100 and the carriage 10. Thus, it is possible to provide an image forming apparatus that is compact in size, highly durable, and facilitates manufacturing and maintenance. The first positioning part 105 and the second positioning part 106 include the projections 105*c* and 106*c*, and lids 105*b* and 106*d* that cover and fix the first positioning system 107 and the second positioning system 108 engaged with the projections 105*c* and 106*c*, respectively. Thus, in the printer 1, the flexible cables FFC1 to FFCn can be attached with a snap, and it is extremely effective even when maintenance is performed where a number of adjustment tools can not be prepared.

While the invention has been described in detail with reference to a specific embodiment thereof, it should be apparent to those skilled in the art that various changes and modifications may be made therein without departing from the spirit and scope of the invention.

What is claimed is:

1. A flexible cable harness, comprising:

a plurality of flexible cables, each having a first end connected to a first object and a second end connected to a second object, at least one of the plurality of flexible cables contributing to an electrical connection between the first object and the second object, each of the plurality of flexible cables comprising:

a curved portion that curves between the first end and the second end;

a first positioning system added near the first end in the curved portion; and a second positioning system added near the second end in the curved portion, wherein a distance from the first positioning system to the second positioning system is different in each of the plurality of flexible cables such that more inward flexible cables located at the curved portion are shorter in distance between the first positioning system and the second positioning system, the first positioning system of each of the plurality of flexible cables is fixed to a first positioning part provided on or near the first object, the second positioning system of each of the plurality of flexible cables is fixed to a second positioning part provided on or near the second object, and each of the plurality of flexible cables are spaced in the curved portion.

2. The flexible cable harness according to claim 1, wherein the first object is a fixed member, the second object is a movable member, the first positioning system of each of the plurality of flexible cables is fixed to the first positioning part provided fixedly with the fixed member, and the second positioning system of each of the plurality of flexible cables is provided on or near the movable member and fixed to the second positioning part movable with the movable member.

3. The flexible cable harness according to claim 1, wherein the distance from the first positioning system to the second positioning system is set in each of the plurality of flexible cables such that a curvature radius of the curved portion is reduced by a specified amount as the flexible cables are located more inward at the curved portion.

4. The flexible cable harness according to claim 1, wherein the first positioning system and the second positioning system are integral with each of the plurality of flexible cables.

5. The flexible cable harness according to claim 1, wherein the first positioning system and the second positioning system are separate pieces and added to each of the plurality of flexible cables.

6. The flexible cable harness according to claim 1, wherein the flexible cables are set in position by engagement of the first positioning system with the first engagement part and the second positioning system with the second engagement part.

7. The flexible cable harness according to claim 1, wherein each of the first positioning system and the second positioning system is provided on a shorter side of each of the plurality of flexible cables, and includes a hole provided beyond a width of each of the plurality of flexible cables, the hole is engaged with a corresponding protrusion provided on each of the first positioning part and the second positioning part in order to set the cables in place.

8. The flexible cable harness according to claim 1, wherein each of the first positioning system and the second positioning system include two holes spaced from each other, and each of the first positioning part and the second positioning part includes two protrusions corresponding to the two holes.

9. The image forming apparatus according to claim 1, wherein the plurality of flexible cables are tied in a bundle.

10. An image forming apparatus including the flexible cable harness according to claim 2, wherein the fixed member is a control circuit board fixed to a frame, the movable member is a carriage mounting a recording head thereon, and the flexible cable harness is connected to the control circuit board on the first end and the carriage on the second end.

11. The image forming apparatus according to claim 10, wherein the frame includes left and right side plates supporting a guide shaft that guides the carriage in a movable direction and a rear frame provided between the left and right side plates, and the carriage has a substantially box shape and two sides for positioning the recording head, the first positioning part is disposed at a substantially central portion of the rear frame with respect to a left to right direction thereof, and the second positioning part is disposed on one of the two sides of the carriage.

12. The image forming apparatus according to claim 11, wherein the first positioning part and the second positioning part include protrusions engageable with the holes of the first positioning system and the second positioning system and lids that cover and fix the first positioning system and the second positioning system respectively.

13. The image forming apparatus according to claim 11, wherein the second positioning part is provided with a guide portion that guides the flexible cable harness extending from the first positioning part therein invariably at a specified angle relative to a direction perpendicular to a travel direction of the carriage.

14. The image forming apparatus according to claim 13, wherein the guide portion includes a pair of guide members to pinch and guide the flexible cable harness from both sides thereof.

15. The image forming apparatus according to claim 13, wherein the specified angle is from 35° to 60°.

16. A flexible cable harness, comprising:

a plurality of flexible cables, each having a first end connected to a first object and a second end connected to a moveable second object, at least one of the plurality of flexible cables contributing to an electrical connection between the first object and the second object, each of the plurality of flexible cables comprising:

a curved portion that curves between the first end and the second end;

a first positioning system added near the first end in the curved portion; and a second positioning system added near the second end in the curved portion, wherein the first positioning system of each of the plurality of flexible cables is fixed to a first positioning part provided on or near the first object, the second positioning system of each of the plurality of flexible cables is fixed to a second positioning part provided on or near the second object, and the second positioning part is provided with a guide portion that guides the flexible cable harness extending from the first positioning part therein invariably at a specified angle relative to a direction perpendicular to a travel direction of the second object.

17. The flexible cable harness according to claim 16, wherein a distance from the first positioning system to the second positioning system is different in each of the plurality of flexible cables such that more inward flexible cables located at the curved portion are shorter in distance between the first positioning system and the second positioning system and each of the plurality of flexible cables are spaced in the curved portion.

* * * * *